US011881086B2

(12) United States Patent
Moskowitz

(10) Patent No.: US 11,881,086 B2
(45) Date of Patent: Jan. 23, 2024

(54) METHODS, SYSTEMS, AND APPARATUS FOR PLAYING POKER, BLACKJACK AND BACCARAT

(71) Applicant: Ahmnon D. Moskowitz, Rockville, MD (US)

(72) Inventor: Ahmnon D. Moskowitz, Rockville, MD (US)

( * ) Notice: Subject to any disclaimer, the term of this patent is extended or adjusted under 35 U.S.C. 154(b) by 0 days.

(21) Appl. No.: 17/474,410

(22) Filed: Sep. 14, 2021

(65) Prior Publication Data

US 2021/0407257 A1 Dec. 30, 2021

Related U.S. Application Data

(63) Continuation of application No. 16/457,946, filed on Jun. 29, 2019, now Pat. No. 11,127,261.

(60) Provisional application No. 62/696,503, filed on Jul. 11, 2018.

(51) Int. Cl.
*G07F 17/32* (2006.01)

(52) U.S. Cl.
CPC ........ *G07F 17/3293* (2013.01); *G07F 17/322* (2013.01); *G07F 17/3209* (2013.01); *G07F 17/3211* (2013.01); *G07F 17/3258* (2013.01)

(58) Field of Classification Search
CPC ............. G07F 17/3293; G07F 17/3209; G07F 17/3211; G07F 17/322; G07F 17/3258
See application file for complete search history.

(56) References Cited

U.S. PATENT DOCUMENTS

| | | | |
|---|---|---|---|
| 3,796,433 | A | 3/1974 | Fraley et al. |
| 4,339,134 | A | 7/1982 | Macheel |
| 4,380,334 | A | 4/1983 | Minkoff et al. |
| 5,154,429 | A | 10/1992 | LeVasseur |
| 5,257,789 | A | 11/1993 | LeVasseur |
| 5,395,119 | A | 3/1995 | Jacob et al. |
| 5,605,334 | A | 2/1997 | McCrea, Jr. |
| 5,791,991 | A | 8/1998 | Small |

(Continued)

FOREIGN PATENT DOCUMENTS

WO 2004015529 A2 2/2004

OTHER PUBLICATIONS https://en.wikipedia.org/wiki/Catch_21. Accessed Jul. 16, 2018.

(Continued)

*Primary Examiner* — Seng H Lim
(74) *Attorney, Agent, or Firm* — The Roy Gross Law Firm, LLC; Roy Gross

(57) ABSTRACT

Methods, Systems and apparatuses for playing a regulated casino wagering game with poker or blackjack cards. Disclosed is a trade-in 21 game where a player gets a payout if they have under 21 or exactly within a quantity of cards and a payout if they receive multi 21's within that game. Those same features can be used in a casino table apparatus played electronically or as a lottery game. Also disclosed is a place card poker game where a player selects the position of the poker zone. Also disclosed are place card games for poker and a numerical objective that that can be played as a tournament or a social game. Also disclosed is a baccarat table game where a player wagers on the specific numerical additive value of the cards with payouts specific in general correspondence to the probability of winning that said value.

4 Claims, 10 Drawing Sheets

(56) References Cited

U.S. PATENT DOCUMENTS

| | | | | | |
|---|---|---|---|---|---|
| 5,823,873 | A * | 10/1998 | Moody | A63F 1/00 463/13 |
| 6,206,375 | B1 * | 3/2001 | Wichinsky | A63F 3/00157 273/274 |
| 6,279,910 | B1 | 8/2001 | de Keller | |
| 6,345,823 | B1 | 2/2002 | Webb | |
| 6,481,719 | B2 * | 11/2002 | Webb | G07F 17/3293 273/292 |
| 6,581,937 | B1 | 6/2003 | Crisswell | |
| 6,719,291 | B1 | 4/2004 | deKeller | |
| 6,869,075 | B1 * | 3/2005 | Stavinsky | A63F 3/00157 273/274 |
| 6,869,077 | B1 * | 3/2005 | Ozmulla | A63F 3/00157 273/274 |
| 7,201,654 | B1 * | 4/2007 | Jarvis | A63F 1/00 463/13 |
| 7,367,564 | B2 | 5/2008 | Latell | |
| 7,389,989 | B1 * | 6/2008 | Hong | A63F 1/00 273/274 |
| 7,419,160 | B1 | 9/2008 | D'Ambrosio | |
| 7,591,728 | B2 | 9/2009 | Gioia et al. | |
| 7,758,411 | B2 | 7/2010 | Crawford et al. | |
| 7,785,182 | B2 | 8/2010 | Thomas et al. | |
| 7,785,184 | B2 | 8/2010 | Jubinville et al. | |
| 7,824,254 | B2 | 11/2010 | Dunaevsky et al. | |
| 8,439,362 | B1 | 5/2013 | deKeller | |
| 8,602,864 | B1 * | 12/2013 | Lewis | G07F 17/3244 463/18 |
| 8,926,421 | B2 | 1/2015 | Arezina et al. | |
| 9,257,006 | B2 | 2/2016 | Gagner et al. | |
| 9,286,747 | B2 | 3/2016 | Chang et al. | |
| 9,552,701 | B2 | 1/2017 | Pececnik | |
| 10,930,119 | B2 * | 2/2021 | Moskowitz | G07F 17/3244 |
| 2002/0111205 | A1 | 8/2002 | Beavers | |
| 2002/0147042 | A1 | 10/2002 | Vuong et al. | |
| 2003/0027621 | A1 | 2/2003 | Libby et al. | |
| 2004/0015529 | A1 | 1/2004 | Tanrikulu et al. | |
| 2004/0176155 | A1 | 9/2004 | Gold et al. | |
| 2006/0135238 | A1 * | 6/2006 | Lancaster | G07F 17/3267 463/12 |
| 2006/0273519 | A1 * | 12/2006 | Aida | A63F 1/00 273/292 |
| 2007/0090598 | A1 | 4/2007 | Regos | |
| 2007/0120320 | A1 | 5/2007 | Miltenberger et al. | |
| 2007/0135203 | A1 | 6/2007 | Nicely | |
| 2008/0076572 | A1 | 3/2008 | Nguyen et al. | |
| 2008/0122177 | A1 | 5/2008 | Kling et al. | |
| 2008/0207292 | A1 | 8/2008 | Yoshizawa | |
| 2008/0214256 | A1 | 9/2008 | Yoshizawa | |
| 2008/0246219 | A1 | 10/2008 | Kyrychenko | |
| 2008/0296840 | A1 | 12/2008 | Snow | |
| 2009/0042639 | A1 | 2/2009 | Yoshizawa | |
| 2009/0104962 | A1 | 4/2009 | Nicely et al. | |
| 2009/0121434 | A1 | 5/2009 | Baerlocher et al. | |
| 2009/0170595 | A1 | 7/2009 | Walker | |
| 2009/0295087 | A1 | 12/2009 | Kling et al. | |
| 2010/0048277 | A1 * | 2/2010 | Moody | A63F 3/0421 463/16 |
| 2010/0078892 | A1 | 4/2010 | Gore | |
| 2010/0130280 | A1 | 5/2010 | Arezina et al. | |
| 2010/0171267 | A1 | 7/2010 | Walker | |
| 2010/0213671 | A1 | 8/2010 | Ko | |
| 2010/0261515 | A1 | 10/2010 | Tobias et al. | |
| 2010/0298039 | A1 | 11/2010 | Dunaevsky et al. | |
| 2011/0057390 | A1 | 3/2011 | Scalisi | |
| 2011/0068536 | A1 * | 3/2011 | Malamut | A63F 1/02 273/296 |
| 2011/0140359 | A1 | 6/2011 | Polynice | |
| 2012/0252564 | A1 | 10/2012 | Moore et al. | |
| 2012/0280452 | A1 | 11/2012 | Baseel | |
| 2013/0102381 | A1 | 4/2013 | Nelson et al. | |
| 2014/0038680 | A1 | 2/2014 | Pececnik et al. | |
| 2014/0094238 | A1 | 4/2014 | Huxley et al. | |
| 2015/0130134 | A1 | 5/2015 | Lucier | |
| 2016/0314656 | A1 | 10/2016 | Book | |
| 2016/0379443 | A1 | 12/2016 | Abbott | |
| 2017/0032622 | A1 * | 2/2017 | Moskowitz | G07F 17/3262 |
| 2017/0046910 | A1 | 2/2017 | Sherrets et al. | |
| 2017/0203198 | A1 | 7/2017 | Lysowski et al. | |
| 2017/0203199 | A1 | 7/2017 | Abrahamson | |
| 2017/0203200 | A1 | 7/2017 | Abrahamson | |
| 2017/0345257 | A1 | 11/2017 | Gagner et al. | |
| 2018/0015358 | A1 | 1/2018 | Mahon | |
| 2018/0075705 | A1 | 3/2018 | Lee | |
| 2018/0082540 | A1 * | 3/2018 | Moskowitz | G07F 17/3288 |
| 2018/0276950 | A1 | 9/2018 | LaDuca et al. | |

OTHER PUBLICATIONS https://play.google.com/store/apps/details?id=air.com.differencegames.towerof21free, Accessed Jul. 16, 2018.
https://www.gsn.com/games/free/catch21, Accessed Jul. 16, 2018.
Notice of References Cited, U.S. Appl. No. 14/322,351, dated May 12, 2016.

* cited by examiner

| | Bet $2 | Bet $4 | Bet $6 |
|---|---|---|---|
| Royal Flush | $ 300 | $ 600 | $ 900 |
| Straight Flush | $ 60 | $ 120 | $ 180 |
| Four of kind | $ 40 | $ 80 | $ 120 |
| Full House | $ 6 | $ 12 | $ 18 |
| Flush | $ 5 | $ 10 | $ 15 |
| Straight | $ 4 | $ 8 | $ 12 |
| Three of kind | $ 3 | $ 6 | $ 9 |
| Two Pairs | $ 2 | $ 4 | $ 6 |
| Kings or Better | $ 1 | $ 2 | $ 3 |

METHODS, SYSTEMS, AND APPARATUS FOR PLAYING POKER, BLACKJACK AND BACCARAT

CROSS REFERENCE TO RELATED APPLICATIONS

This application is a continuation of U.S. Ser. No. 16/457,946 filed Jun. 29, 2019 entitled "METHODS, SYSTEMS, AND APPARATUS FOR PLAYING POKER, BLACKJACK AND BACCARAT" which claims priority to U.S. 62/696,503 entitled "METHODS, SYSTEMS, AND APPARATUS FOR PLAYING POKER, BLACKJACK AND BACCARAT" filed Jul. 11, 2018, which is incorporated by reference herein in its entirety.

This application incorporates by reference the following applications in their entirety: U.S. Ser. No. 14/332,351, filed Jul. 15, 2014, entitled "METHODS, SYSTEMS, AND APPARATUS FOR PLAYING POKER, BLACKJACK AND BACCARAT"; U.S. Provisional Patent Application No. 61/846,608, filed Jul. 15, 2013, entitled "METHODS, SYSTEMS, AND APPARATUS FOR PLAYING POKER, BLACKJACK AND BACCARAT"; U.S. Ser. No. 15/162,541, filed on May 23, 2016, entitled "METHODS, SYSTEMS, AND APPARATUS FOR PLAYING MULTI-ZONE 21; U.S. 62/165,870, filed on May 22, 2015, entitled "METHODS, SYSTEMS, AND APPARATUS FOR PLAYING MULTI-ZONE 21.

FIELD OF THE INVENTION

The present invention relates generally to a numbers game, more specifically; blackjack, poker, twenty-one or baccarat card games. The present invention relates to systems and methods of playing numerical objective themed casino games, place card games either on a table or electronically as a single player game, multiplayer games or games on a lottery scratch ticket.

BACKGROUND OF THE INVENTION

Card games are a staple of most casinos and played electronically on gaming devices or on client devices, which communicate with servers over a network.

U.S. Pat. Nos. 3,796,433 and 5,257,789 and International Publication No. WO/2004015529 are examples of means of electronic blackjack. U.S. Pat. No. 5,605,334 is an example of an electronic smart system used for keeping track of wagers. U.S. Pat. Nos. 6,581,937 and 7,367,564 are examples of math games where players have no control of the starting variables. U.S. Pat. Nos. 5,823,873, 7,758,411, 4,339,134, 4,380,334 are examples of electronic poker and the methods played therein.

In blackjack, generally the object is to get 21 or have a value that is of greater value than the dealer. Generally, the object of poker is to get the highest poker hand possible and with some variations of poker such as Omaha-high low or Razz the objective is to get the lowest value.

It is an object of the present invention provide improved casino like games that are fun and engaging for players.

SUMMARY OF INVENTION

Casino poker, i.e. jacks or better, is a game where players have five cards and players trade them in with the objective of making a high poker hand. There is no such trade-in game with a 21 objective and it is an object of the invention to do this.

Other objects of the invention are to reward higher payouts to players achieving multiple 21's or exactly 21 with many cards where players have the ability to choose to hold or trade in cards and have control over their decisions on what cards to play or discard.

Electronic single player skill poker games in casino poker are almost entirely trade-in games. It is an object of this application to provide a poker skill game that does not require trade-in's but offers an alternative game play.

It is an object of the invention to provide a multi-player poker or numerical objective social game that allows a player to keep or pass a card to an opponent.

It is an object of the present invention to provide table games offering high payouts with multi-21 objectives.

It is an object of the invention to provide a poker tournament and/or game based on skill where players have generally the same card selections throughout the tournament and/or game.

It is an object of the invention to have a 21 tournament and/or game based on skill where players have the same card selection throughout the tournament and/or game.

It is an object of the invention to have a baccarat game whereby baccarat players receive more betting options and it is an object of the invention to provide an option for baccarat players to wager on the precise outcome of all numerical possibilities for both the player and banker with a payout that is in general correspondence with the probability of winning.

It is also an object of the invention to create a scratch lottery game with a multi-numerical (multi-21) objective and a numerical (21) objective with a high quantity of cards.

It is an object of the invention to have a table apparatus and computerized betting system allowing wagering for different ways the dealer can have a 21 value.

These and other objects of the invention are achieved by providing an electronic gaming system for playing these games, said system comprising: at least one display device; a wager input device that accepts vouchers and physical currency; a processor; and a controller programmed to control an electronic game and at least a functioning memory device. In certain embodiments, cards are presented on the screen via the processor. A player selects via the controller which cards to keep and upon actuation, the player is presented replacement cards. There is a payout if a player achieves 21 a multiple of times within the game and a payout if a player achieves less than 21 or exactly 21 with a predetermined quantity of cards.

The invention also is directed to a table game and scratch game with similar payout predeterminations, wherein the top payout is based upon an expected value based in part on the cumulative possibility of having a numerical value of twenty-one (21), a plurality of times or 21 with a high quantity of cards.

The invention also is directed at a poker game where upon actuation of the game via a player's card or currency, a player selects a zone to place a poker card in and is awarded according to the pay table. Also presented is a tournament poker and numerical objective game, where a player is awarded points instead and the winner(s) are determined by the player(s) that have the most points.

The invention also is directed to a multiplayer game for 21 or poker where a player is presented a card and can pass the card to another player or add the value to their own hand.

The invention also is directed to a table game with a multi 21 objective.

The invention also is directed to a side-bet for a blackjack game with a progressive payout.

The invention also is directed to a baccarat side-bet where a player can bet on the numerical outcome of either the first four cards in the player's hand and banker's hand or the outcome of the final baccarat cards (up to 6 cards) with the final outcome values of up to nine or eighteen with a payout that is in general correspondence with the probability of winning.

Objects of the invention are achieved by providing an electronic gaming system for playing a casino game, said system comprising: at least one display device having a processor, a memory storage device and a controller programmed to control an electronic casino game having one or more playing zones, the playing zone displayed on the display device, the one or more playing zones each having a plurality of card slots; wherein the at least one display device allows a player to select a wager amount to initiate the game, wherein, upon initiation of the game, cards are added to the one or more playing zones via the processor, until all of the card slots in the one or more playing zones are full; wherein a player selects one or more cards to hold in the one more playing zones; wherein after upon selection of cards by the player, the processor replaces the un-selected cards with new cards until all of the card slots in the one or more playing zones are full; wherein a payout is awarded to the player via the processor if the player achieves a specified numerical value objective in the one or more playing zones.

In certain embodiments, the numerical value objective is selected from a group consisting of 20, 21, 22, 23, 24, 25, 26, 27, 28 and 29.

In certain embodiments, there is a payout if a player receives exactly five cards, six cards, seven cards, eight cards or nine cards which equal the numerical objective.

In certain embodiments, there is a payout if the player achieves multiples of the specified numerical value objective with the perspective playing cards contained within the zone parameter.

In certain embodiments, if a player achieves less than the numerical objective with five, six, seven or eight of the perspective playing cards within the zone parameter a win amount is displayed In certain embodiments, the wager input device is configured to accept real money or virtual money and is configured to accept a wager.

In certain embodiments, the system further comprises a user account, wherein the payout credits the user account of the player.

In certain embodiments, if the player achieves a value of twenty-one (21) in all of the zones, the player receives a payment more than 100 times the wager.

Other objects of the invention are achieved by providing a method for playing a casino game on an electronic gaming system, said method comprising: providing at least one display device having a processor and a controller programmed to control an electronic casino game having one or more playing zones, the one or more playing zones displayed on the display device; wherein the wager input device allows a player an opportunity to select a wager amount to initiate the game, wherein the at least one display device allows a player an opportunity to select a wager amount to initiate the game, wherein, upon initiation of the game, cards are added to the one or more playing zones via the processor, until all of the card slots in the one or more playing zones are full; wherein a player selects one or more cards to hold in the one more playing zones; wherein after upon selection of cards by the player, the processor replaces the un-selected cards with new cards until all of the card slots in the one or more playing zones are full; wherein a payout is awarded to the player via the processor if the player achieves a specified numerical value objective in the one or more playing zones.

In certain embodiments, the numerical value objective is selected from a group consisting of 20, 21, 22, 23, 24, 25, 26, 27, 28 and 29.

In certain embodiments, there is a payout if a player receives exactly five cards, six cards, seven cards, eight cards or nine cards which equal the numerical objective.

In certain embodiments, there is a payout if the player achieves multiples of the specified numerical value objective.

In certain embodiments, a win amount is displayed if a player receives five, six, seven or eight less than the numerical additive objective.

In certain embodiments, the wager input device is configured to accept real money or virtual money and is configured to accept a wager.

In certain embodiments, the method includes a user account, wherein the payout credits the user account of the player.

In certain embodiments, if the player achieves a value of twenty-one (21) in the all of the zones, the player receives a payment more than 100 times the wager.

Other objects of the invention are achieved by providing a computer-implemented method of playing single player multi-zone poker on an electronic gaming device, the method comprising: providing at least one display device having a processor, a memory system for storing instructions and a controller, the controller programmed to control an electronic casino game having at least two playing zones, the at least two or more playing zones displayed on the display device, wherein the at least one display device allows a player an opportunity to select a wager amount to initiate the game; initiating the game of playing single player multi-zone poker via the processor, the game involving: a) receiving via the processor, an initial wager from a player and establishing a credit account, b) revealing a poker card to a player, c) receiving an input from the player regarding which of the at least two zone areas to place the poker card in, d) repeating, by the electronic gaming device, steps (b)-(c), and e) determining via the processor if a player has winning poker hand and displaying a winning amount on the screen.

In certain embodiments, there are exactly two zones with five cards per zone.

Other objects of the invention are achieved by providing a computer-implemented method of playing multi-zone poker on a casino wagering system for a tournament amongst other players, the method comprising: providing at least one display device having a processor, at least a memory device and a controller, the controller programmed to control an electronic casino game having at least two playing zones, the at least two or more playing zones displayed on the display device, wherein the at least one display device allows a player an opportunity to select a wager amount to initiate the game, initiating the game of multi-zone poker via the processor, the game involving: a) revealing a poker card to every player; b) receiving an input from each player regarding which zone area of their playing area to place the poker card in; c) repeating, by the electronic gaming device, steps (b)-(c); d) determining via processor the amount of points a player is to receive for each poker hand and determining the point amount of each player.

In certain embodiments, (a) player(s) with the most points is the winner or the winner(s) advances to the next round of that tournament.

In certain embodiments, a player discards one or more cards.

Other objects of the invention are achieved by providing a computer-implemented method of playing a multi-zone 21 tournament on an electronic gaming device, the method comprising: providing at least one display device a memory device capable of being responsive to a processor, and a controller, the controller programmed to control an electronic casino game having at least two playing zones, the at least two or more playing zones displayed on the display device(s), wherein the display device(s) allows a player an opportunity to select a wager amount to initiate the game, initiating the game of playing multi-zone 21 via the processor, the game involving: a) revealing a blackjack card to a player; b) receiving an input from the player regarding which zone area to place the blackjack card in; c) repeating, by the electronic gaming device, steps (b)-(c); d) determining via processor the amount of points a player is to receive for each zone and determine the point amount of each player with the winner either winning the tournament or advancing to the next round of the tournament.

Other objects of the invention are achieved by providing a computer-implemented method of playing poker on a casino wagering system comprising: providing an electronic gaming device having a wager input device that accepts vouchers and physical currency, a central processing unit, a memory storage device and a controller, wherein the controller controls an electronic game of poker, wherein the electronic game of poker includes a community card zone and at least two player zones; initiating the game via the processor on the electronic gaming device, the game comprising: a) receiving via a processor a wager amount from at least one player, b) selecting cards from a plurality of options before placing cards, c) randomly generating and presenting community cards in the community card zone via a processor, selecting, via a player using the electronic gaming device, a card from the community card zone, wherein the player that first selects the card from the community card zone transfers the card value to the player zone associated with the player; repeating step b-c until at least one of the two player zones has a poker hand; determining via a processor which of the at least two player zones has the winning poker hand, and providing a payout to the player having the winning hand.

In certain embodiments, there are community cards applicable to each player zone.

In certain embodiments, there are a limited number of rounds of card placement for the remaining payers after the game has ended.

Other objects of the invention are achieved by providing a computer-implemented method of managing play of a wagering game by a control processor in communication with a user device, the method comprising: (a) capturing an initial calibration of a game environment background surface associated with an expected location of playing cards; (b) detecting through RFID or an image calibration if the amount of chips of a player have been placed; and (c) detecting through RFID or an image calibration if a player places a bet.

In certain embodiments, there are player cards and dealer cards.

In certain embodiments, the method includes (d) detecting if there is a payout if at least the dealer cards contain a numerical objective a plurality of times; (e) detecting if a specified quantity of cards contains less than a specific value of the numerical objective; and (f) detecting if a specified quantity contains a specific exact value of the numerical objective.

In certain embodiments, the method includes detecting if a poker side-bet payout is paid out.

Other objects of the invention are achieved by providing a table apparatus with a dealer area for player cards and dealer cards wherein the apparatus has a table indicator that indicates payouts.

In certain embodiments, the table apparatus system is configured to: detect if there is a payout if the combined cards contain a numerical objective a plurality of times; detect if a specified quantity of cards contain less than a specific value; and detect if specified quantity contains a specific exact value.

Other objects of the invention are achieved by providing a table apparatus with a system that enters via processor a player's wager into a progressive computer memory storage system.

In certain embodiments, the table apparatus includes a payout indicator.

In certain embodiments, there is a progressive payout structure if the combined cards contain less than 21 for a defined quantity of cards, and wherein there is a progressive payout structure for the dealer having exactly 21 with a high quantity of cards.

Other objects of the invention are achieved by providing a computer-implemented method of playing a baccarat side-bet on an electronic gaming device, the method comprising: providing at least one display device having a processor, and a controller, the controller programmed to control an electronic casino game having a betting area for each numerical outcome of baccarat, the outcome indicia displayed on the display device, wherein the at least one display device allows a player an opportunity to select a wager amount to initiate a side-bet; initiating the game via the processor, the game comprising: a) receiving via the processor, an initial wager from a player and establishing a credit account, b) selecting, via processor, a numerical outcome for the said baccarat game, c) determining if the final result of the baccarat game is the same as a players selection, wherein if a determination that the players selection matches the outcome, the processor credits the players account, and wherein said payout corresponds to the probability of winning that said numerical objective.

In certain embodiments, the numerical outcomes range from 0 through 9.

In certain embodiments, the numerical possibilities the numerical outcomes range from 0 through 18.

Other objects of the invention are achieved by providing an electronic table system for baccarat that allow a player the option to place a wager on any numerical possibly If the numerical baccarat outcome matches the outcome selected by the player there is payout that is in general correspondence with the probability of winning the said objective.

In certain embodiments, the numerical possibilities are 0 through 9.

In certain embodiments, the numerical possibilities are 0 through 18.

The exemplary embodiments described herein can be played on a table apparatus or be played through an electronic server that uses a central processing unit. With the table game variations, these games can be used in conjunction with an electronic betting interface that is connected to an apparatus that utilizes smart recognition technology, so it would be easier for the gaming operator pay the winners. In certain embodiments, the system is connected to push or touch buttons for players to select in a smart system. In certain embodiments, there is a screen that displays the physical cards in the system.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIG. 2D is a display alternative embodiment in which a player starts off with cards and then discards unwanted ones and selects which zone to place the specific cards in.

DETAILED DESCRIPTION OF THE INVENTION

Figure 1A:
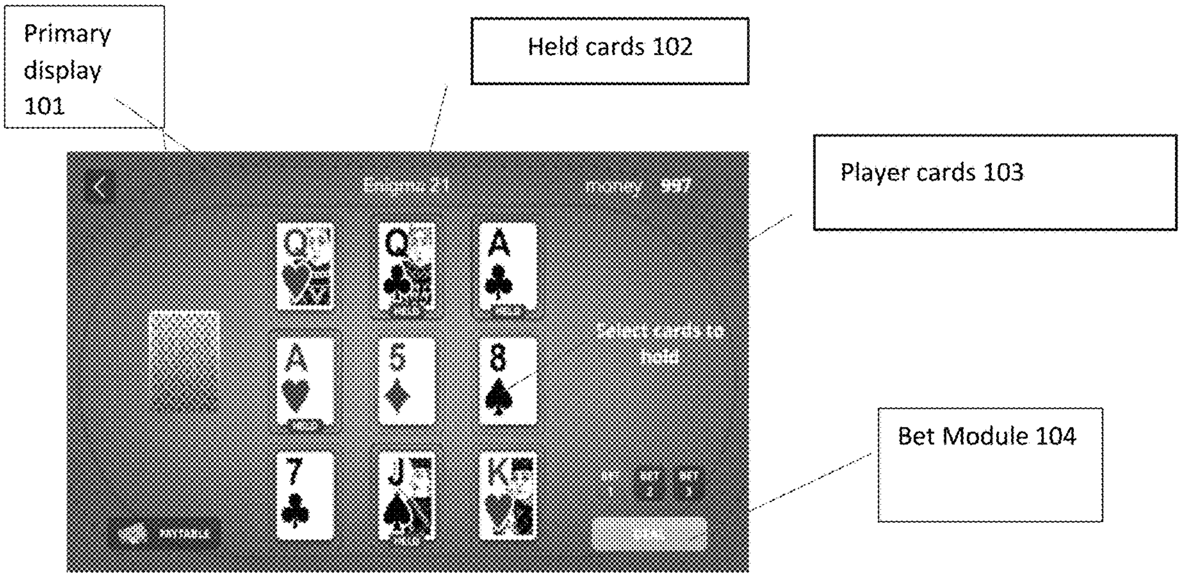
FIG. 1A is the initial setup of an exemplary embodiment of trade-in 21.

This application incorporates by reference the following applications in their entirety: U.S. Ser. No. 14/332,351, filed Jul. 15, 2014, entitled "METHODS, SYSTEMS, AND APPARATUS FOR PLAYING POKER, BLACKJACK AND BACCARAT,"; U.S. Provisional Patent Application No. 61/846,608, filed Jul. 15, 2013, entitled "METHODS, SYSTEMS, AND APPARATUS FOR PLAYING POKER, BLACKJACK AND BACCARAT."; U.S. Ser. No. 15/162,541, filed on May 23, 2016, entitled "METHODS, SYSTEMS, AND APPARATUS FOR PLAYING MULTI-ZONE 21; U.S. 62/165,870, filed on May 22, 2015, entitled "METHODS, SYSTEMS, AND APPARATUS FOR PLAYING MULTI-ZONE 21.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1A-6B illustrate exemplary embodiments of a numbers game, more specifically, blackjack, poker or baccarat card games.

Figure 1B:
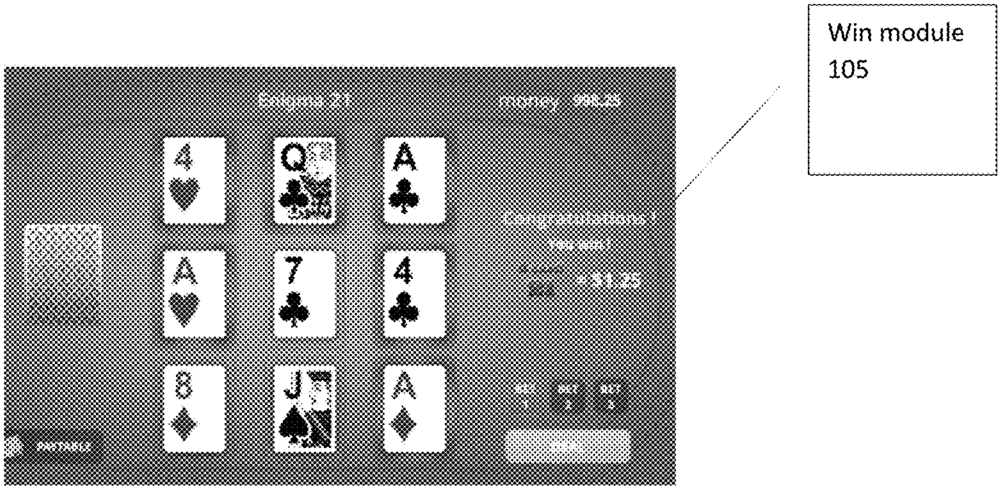
FIG. 1B is the second and final step of the trade-in 21 game of FIG. 1A.

FIGS. 1A and 1B show a primary display 101 of the trade-in 21 game, there is a bet module 104 and a payout module 105 and a card module 103. FIG. 1A is a display of a device (system). The system includes a database to store memory and a central processing unit (not shown). The display device may be a free-standing gaming machine or a personalized computer device.

After a player inserts money into a wager input device through a currency acceptor or transfers it via a player's card or establishes a credit balance on an interactive casino wagering network, a player selects a wager by pressing a wager amount which in this instance is touch but can also be push.

The player is dealt an initial nine cards 103 in the game module however other variants can be with eight, seven or six cards. Here it is displayed on a 3×3 grid; there can be other formations like a line or pyramid formation, i.e. two cards stacked over three, and the three cards stacked over four. It can be appreciated the many objectives that enable the player to win the game:

1) Winning by achieving a numerical additive value of 21 as many times as possible contained within the nine card parameter, in this case it is four times, but with six or seven card parameter the maximum objective would be three×21 and ten and twelve card parameter the maximum objective would be five or six times 21;
2) Achieving a numerical additive value of under 21 with at least six cards contained within the nine card parameter, in other variations it could be four or five cards;
3) Achieving a numerical additive value of exactly 21 with five, six, seven, eight or nine cards within the nine card parameter. The player in this game decides to keep (held cards) 102 the queen of clubs, ace of clubs, and jack of spades and discard the others. The initial cards are stored in the computer's memory as so the computer logic system will not repeat the cards using a single deck system. The computer randomly generates replacement cards, i.e. two 4's two aces a 7 and an 8. Although a player has a double 21 (two aces and two 10's) this game pays only the highest ranking achievement from the pay table and that would be a six card 21 with a payout of $1.25 which is displayed on the screen and credited to a players account. As can be appreciated in the pay table nine card slots that have a numerical additive value of 21 pays the highest so a player has to make a decision of whether to go for 'four 21's or exactly 21 with nine cards.

Figure 1C:
FIG. 1C is the pay table for the trade-in 21 game.

Here is the pay table 106 in FIG. 1C:

| | |
|---|---|
| 1 × 21 | 0.25 |
| 2 × 2 | 1 |
| 3 × 21 | 2 |
| 4 × 21 | 500 |
| 7 cards under 21 | 1 |
| 8 cards under 21 | 10 |
| 9 cards under 21 | 1000 |
| 5 card 21 | 0.25 |
| 6 card 21 | 1.25 |
| 7 card 21 | 10 |
| 8 card 21 | 1,000 |
| 9 card 21 | 50,000 |

This game can also be played as a lottery scratch ticket with the above characteristics and similar pay table. After the material is scratched, an instant determination is made as to whether the ticket is a winner. This game could be played with any numerical objective, in this embodiment the system uses blackjack playing cards though a scratch playing card can use non-blackjack numerical indicia.

Figure 1D:
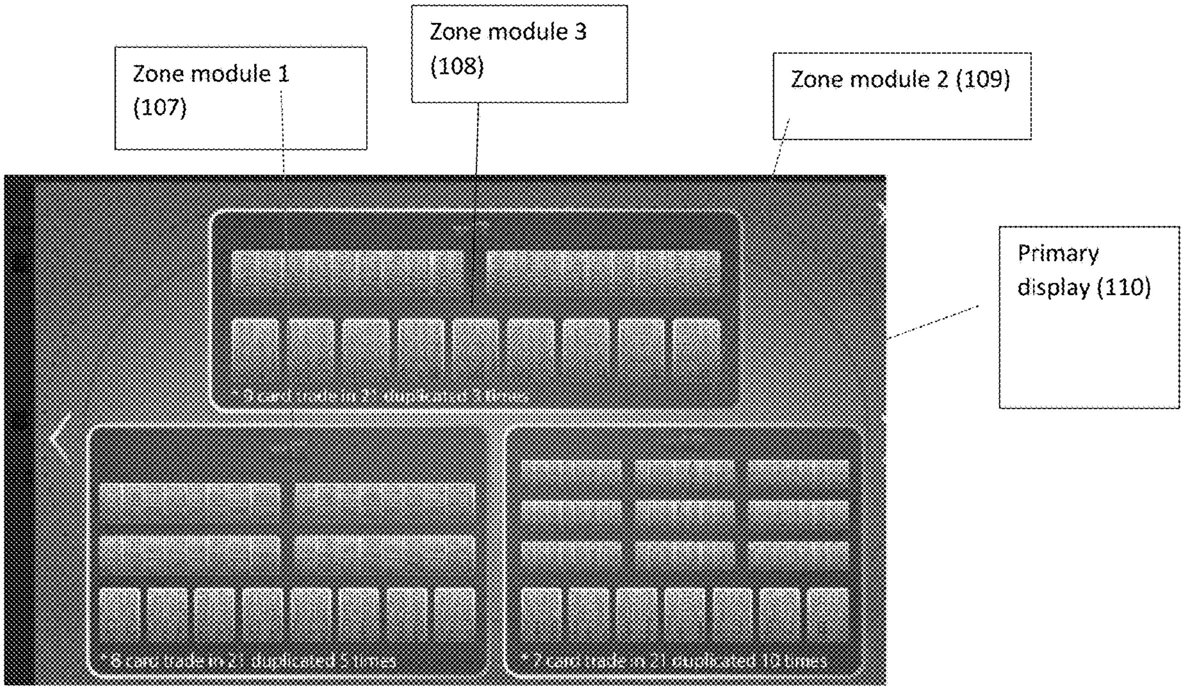
FIG. 1D is an embodiment of a menu option for a three zone 9 card parameter trade in 21 game, a five zone eight card parameter and ten zone seven card parameter multi-trade-in 21 game.

FIG. 1D is a schematic of three separate games with multizone trade-in 21. On the top of the screen a player can select to play three zones 107 with a nine card parameter per a zone, on the lower left a player can select five zones 108 with an eight card parameter per a zone, and the lower right a player can select ten zones 109 with a seven card parameter.

Figure 2A:
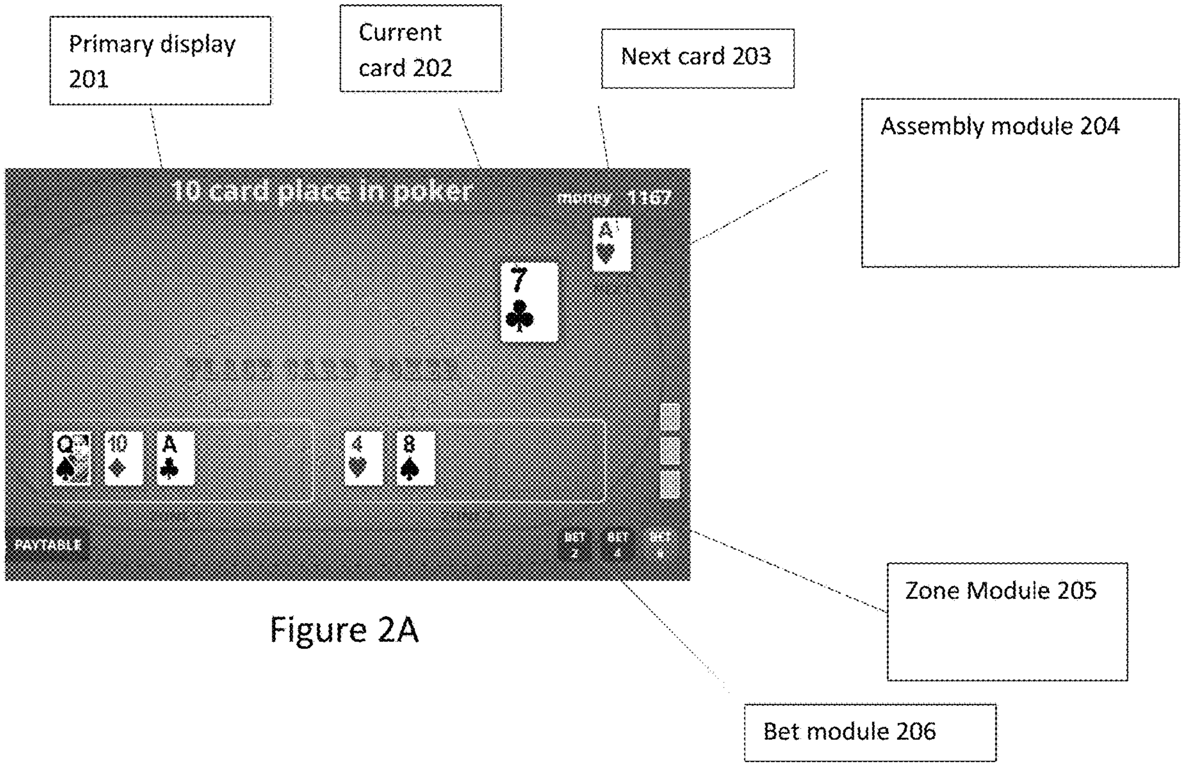
FIG. 2A is a primary display of place card poker in progress.
Figure 2B:
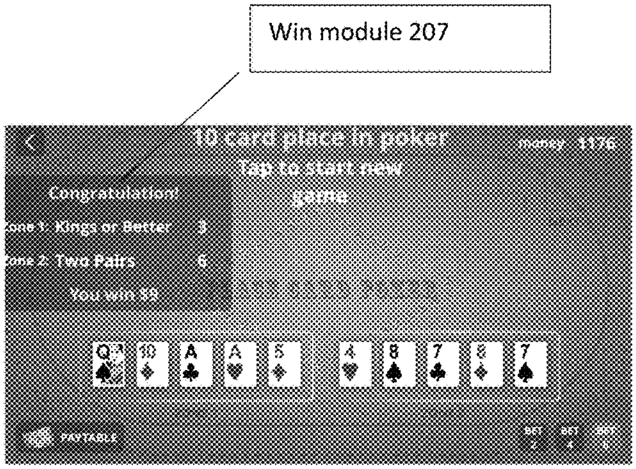
FIG. 2B is the game of FIG. 2A played out to completion.

FIG. 2A is a primary display 201 of "Place Card Poker" in this game a player is shown a current card the 7 of clubs and a next card the ace of hearts on a single assembly module. A player touches (it can also be a push button) one of the two zone modules 204, 205. The screen is bifurcated with one zone on the left side 204 and one zone on the right side 205 to place the card in, the objective is to achieve a high poker hand with a payout according to the pay table. FIG. 2B Shows the game played out to completion. A player has two aces in zone one 204 winning $3 and two pairs in zone 205 winning $6, a total of $9, in this game there is a payout for both zones however a game can have rules that there is a payout paying only the high zone. This embodiment has two zones however a game can have three four or five zones.

Figure 2C:
FIG. 2C is the pay table for place card poker game.

FIG. 2C shows the poker payout 208 for the poker hand for each zone:

| | |
|---|---|
| Royal Flush | $300 |
| Straight Flush | 60 |
| Four of a kind | 40 |
| Full house | 6 |
| Flush | 5 |
| Straight Flush | 4 |
| Three of a kind | 3 |
| Two pairs | 2 |
| Kings or Better | 1 |

Figure 2D:
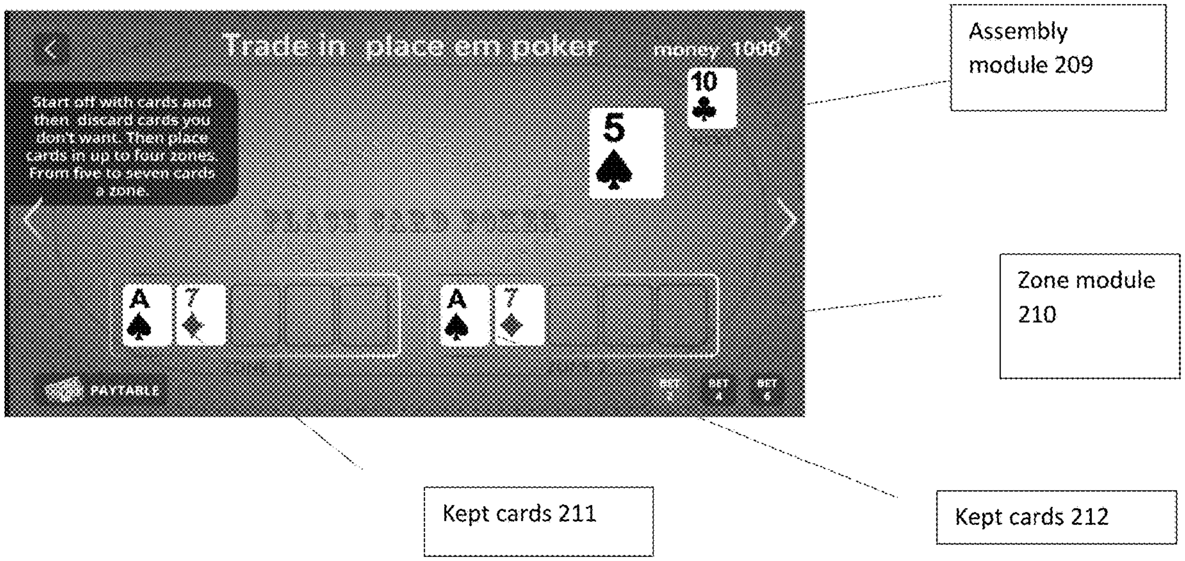

FIG. 2D is a game of place card poker where a player starts off with five randomly selected cards in a zone module 210 and then discards selected cards. In this game, a player kept the Ace of spades and seven of diamonds which is repeated in both zones. The player selects which zone to places the cards in from the current card slot. When a player fills all of the card slots the game is over.

Figure 2E:
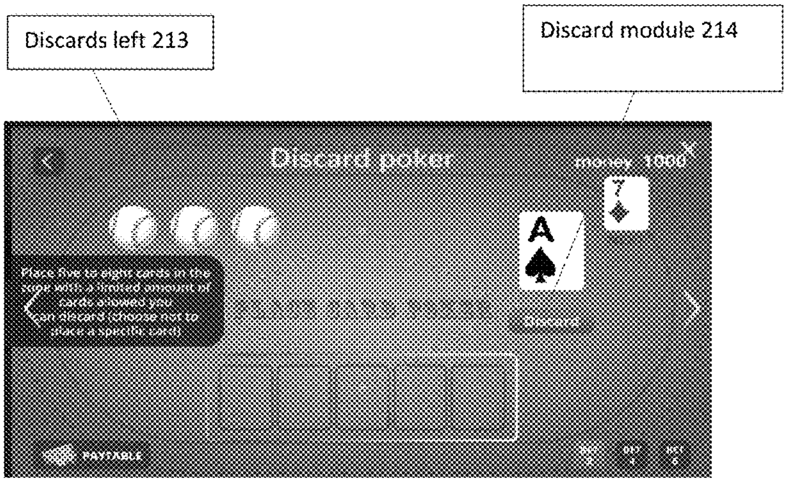
FIG. 2E is a digital display of an electronic poker with a discard button.

In FIG. 2E a player has the option of discarding a card by pressing the discard button in the discard module 214 and can only press it a limited amount of times (outs) up to three times. Once the zone is full the game has ended and if a player has a high poker there is a payout according to a paytable. In this embodiment there is one zone however this can be played with a plurality of zones in other embodiments.

Figure 3:
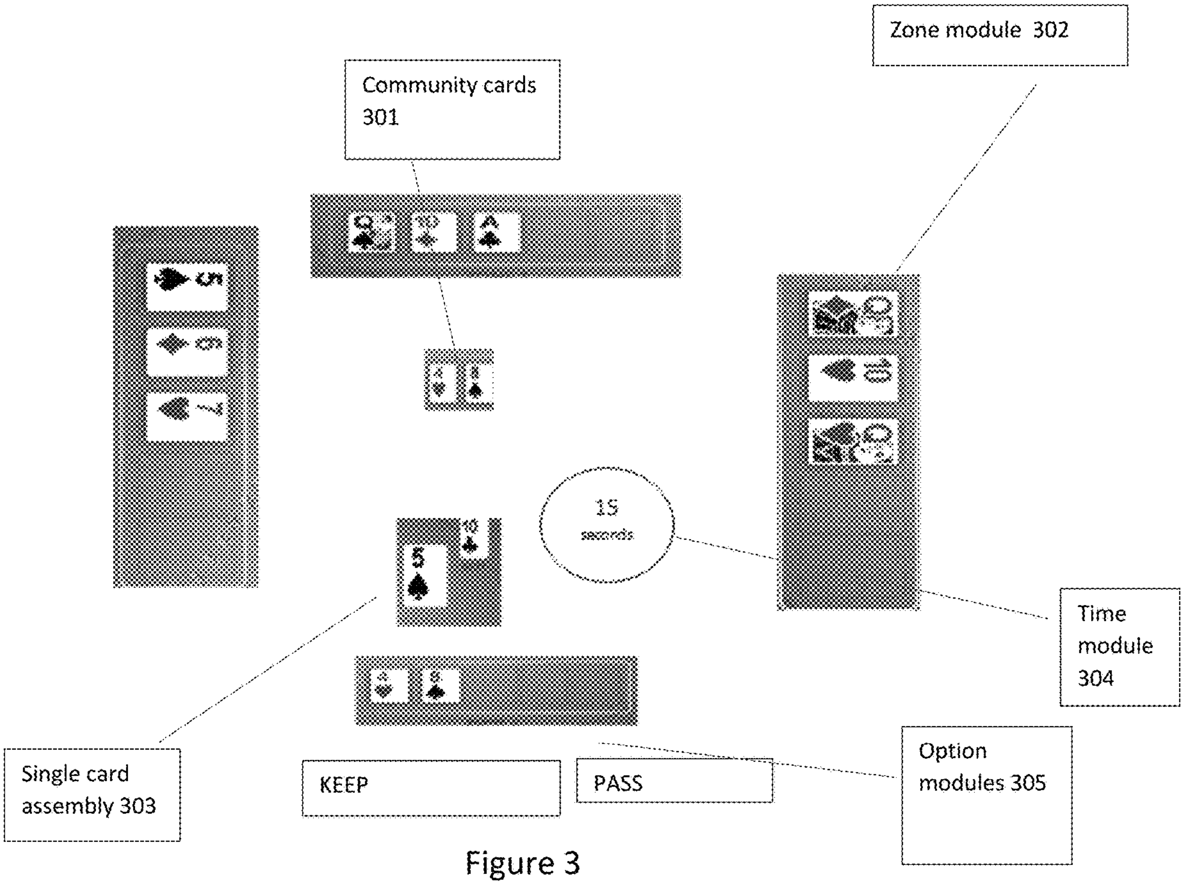
FIG. 3 is a multiplayer game for poker or a numerical objective with a hold and pass button.

FIG. 3 is a schematic of a multiplayer gaming system for a plurality of players being positioned about an electronic casino table game. There are two games that can be played with this gaming system. 1) poker and 2) numerical objective; this can be 21 or any other numerical objective which can be determined randomly by a computer. Poker or blackjack cards are used in the game play. There are community cards 301 in the center of the game though there does not need to be.

There are two community cards 301 shown, but there can be one, three four or five. The community cards are cards that can be applicable to each of the players zones 302. After community cards are revealed the computer randomly selects which player will go first. Then two cards in a single assembly module are revealed each player has one of two options: 1) add the card value to their zone or 2) pass the card to an opponent's hand, with the possibility of hurting the opponent. In this case the card would be placed to an adjacent opponent but in other variants a player can select an opponent for whom to pass too. In this game a player can add up to five cards to the value of their hand other variations it can be, three, four, six or seven.

For the numerical objective game, the game ends when a player has a numerical objective which is 21 in this embodiment other embodiments could have numerical objective randomly chosen by the gaming operator. The gaming council would display on the display screen that the player is a winner if the numerical objective is achieved.

In poker the game ends if a player has an optimal hand i.e. a royal flush or if a player has filled all of their card slots. A process is initiated with up to two rounds wherein the remaining players keep or pass cards. There is also a time module as to limit a player's time. This game can also be played with live cards using a smart reader to read the cards to display on a monitor. The player area could also contain push or touch buttons.

Figure 4:
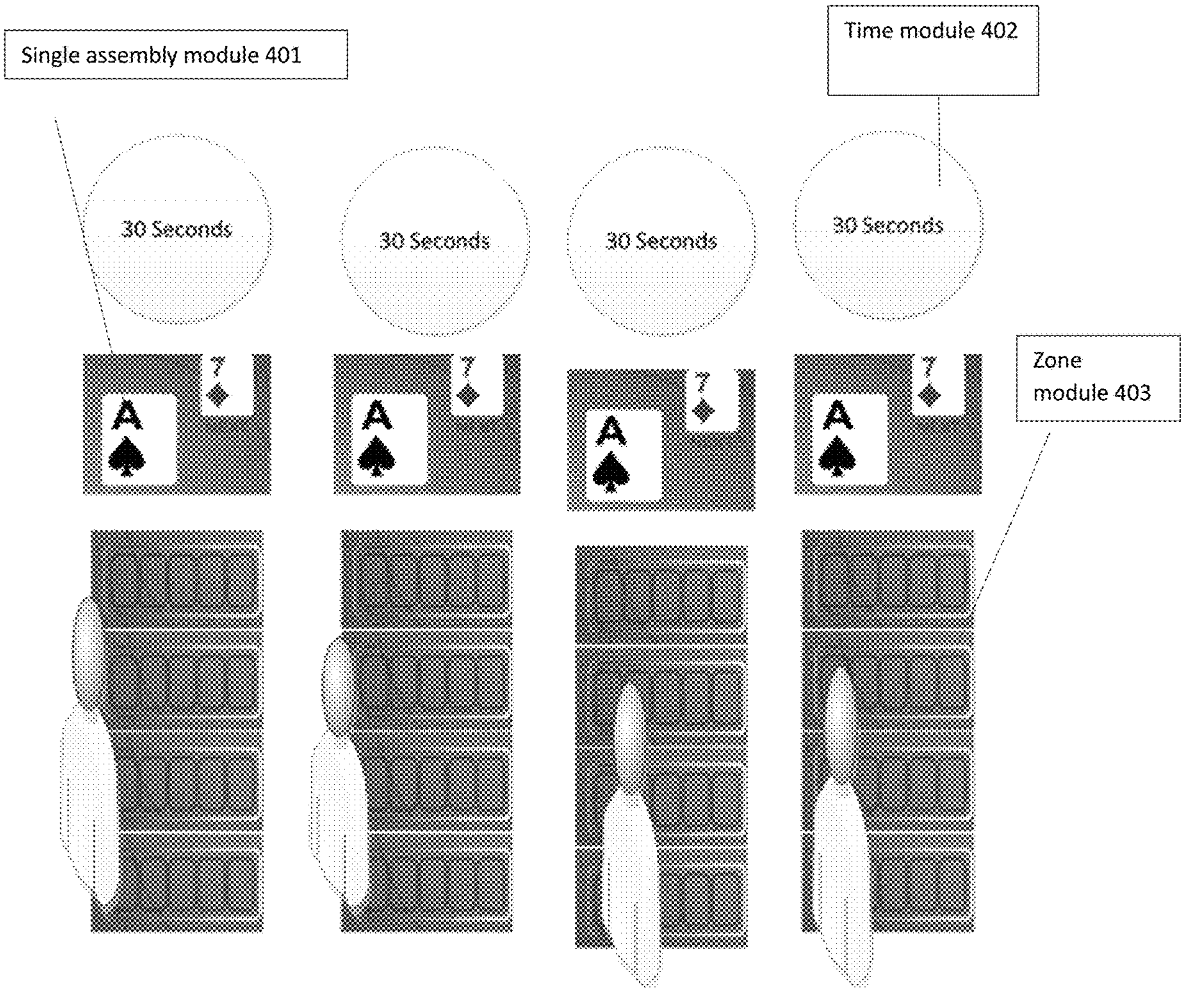
FIG. 4 is a schematic of a poker hand objective or 21 objective tournament.

FIG. 4 is a schematic of a gaming tournament. This can be for either poker or a numerical objective which in this case is a 21.

Each player has the same single assembly of cards. Each player has to separately decide which zone to place the same card value in. There is a time module 402 of where to place card within the zone. In poker instead of being awarded money as in the aforementioned pay scale the player is awarded points corresponding to their poker hand within the zone. This can be as a limited card poker tournament i.e. twenty cards, five for each of the four zones, ending when the players place the remaining card. This can also be done with a single deck or a plurality of decks with the zone resetting when either a zone is full. The (A) player(s) that receives the most points is the winner or advances to the next round. In the 21 or numerical there are variation to rules are in my U.S. Pat. No. 9,965,924, a player with the most points is a winner or advances to compete against other players in a next round. In both these games there can be a discard option where a player can discard a limited number of cards.

Figure 5A:
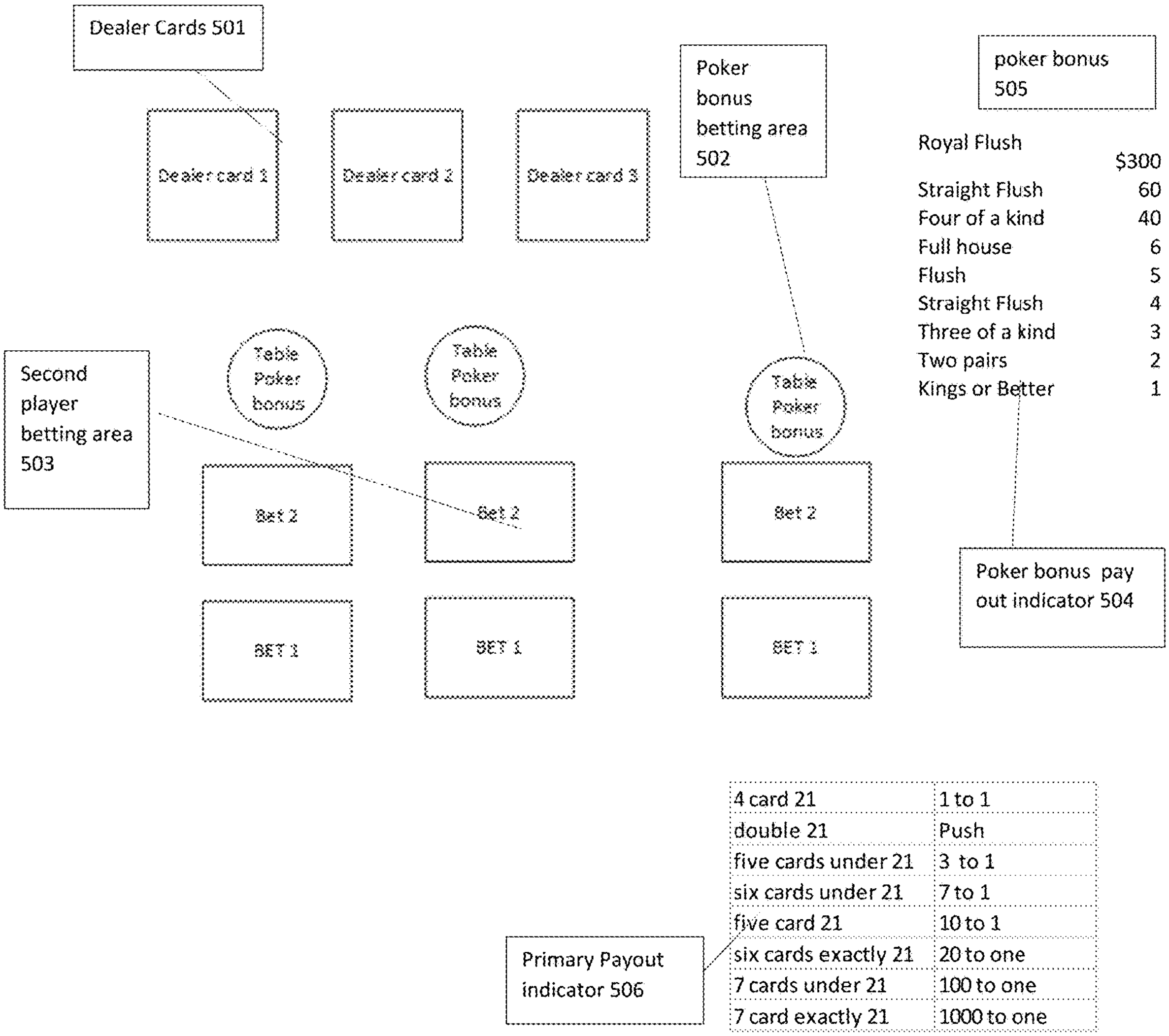
FIG. 5A is an embodiment of a Table variation of the game in FIGS. 1A-1C.

FIG. 5A is a schematic of a table game using similar payouts objectives to that of enigma 21, a player places their chips on Bet 1 and is dealt four cards (this can also be three or two) to see the dealers three cards a player places a second bet on BET 2, if a player does not think they can achieve an objective from the payscale they do not place a second bet and they are out of the game and forfeit their first bet Here there are two stages Bet 1 and Bet 2 however there can be more stages with additional betting areas. i.e. bet 3 and bet 4. For example, the dealer can have five cards and a player would have to anti additional amounts to see the additional cards in stages. If a player did not fold and places a Bet on Bet 2 a dealer would tabulate the players cards in addition to the dealer's card and would pay out according to the pay table: as follows:

| | |
|---|---|
| 4 card 21 | 1 to 1 |
| double 21 | Push |
| five cards under 21 | 3 to 1 |
| six cards under 21 | 7 to 1 |
| five card 21 | 10 to 1 |
| six cards exactly 21 | 20 to one |
| 7 cards under 21 | 100 to one |
| 7 card exactly 21 | 1000 to one |

Here there is a pay table for seven cards however the game can be played with six, five, eight or nine.

An additional variation is that the player places an anti on all the betting modules and can retract it after seeing some of the cards. Though in this game there are three dealer cards other variations can be, two, four, five six seven or eight. Though the dealers cards are in a single line this can be played with two intersecting lines. i.e. a T shape. and a player would only use the better of the two values and there would be a common intersecting card.

A player can also place an additional wager on the poker or 21 outcome of the table cards. In the area marked poker bonus a player can place an additional side-bet that the table cards marked with the "poker bonus" will make a high poker hand. When the dealer concludes dealing table cards, a calculation is made with the players hand in combination with the house hand if a payout should be made according to the pay table. This game can also be played against a dealer's hand with like rankings i.e. three 21's would beat five cards under 21. This game can also be played players vs players as a Texas holdem like game or trade-in poker game, with the highest ranking hand the winner. As in Texas holdem each player would be dealt whole cards, two to four cards per a player and players would place wagers against other players as the community cards are revealed in stages. In Texas holdem there are three betting stages "The flop" the turn" or the river in Texas holdem there are five community cards other variants can have more or less community cards. The player with the highest ranking hand is the winner.

Figure 5B:
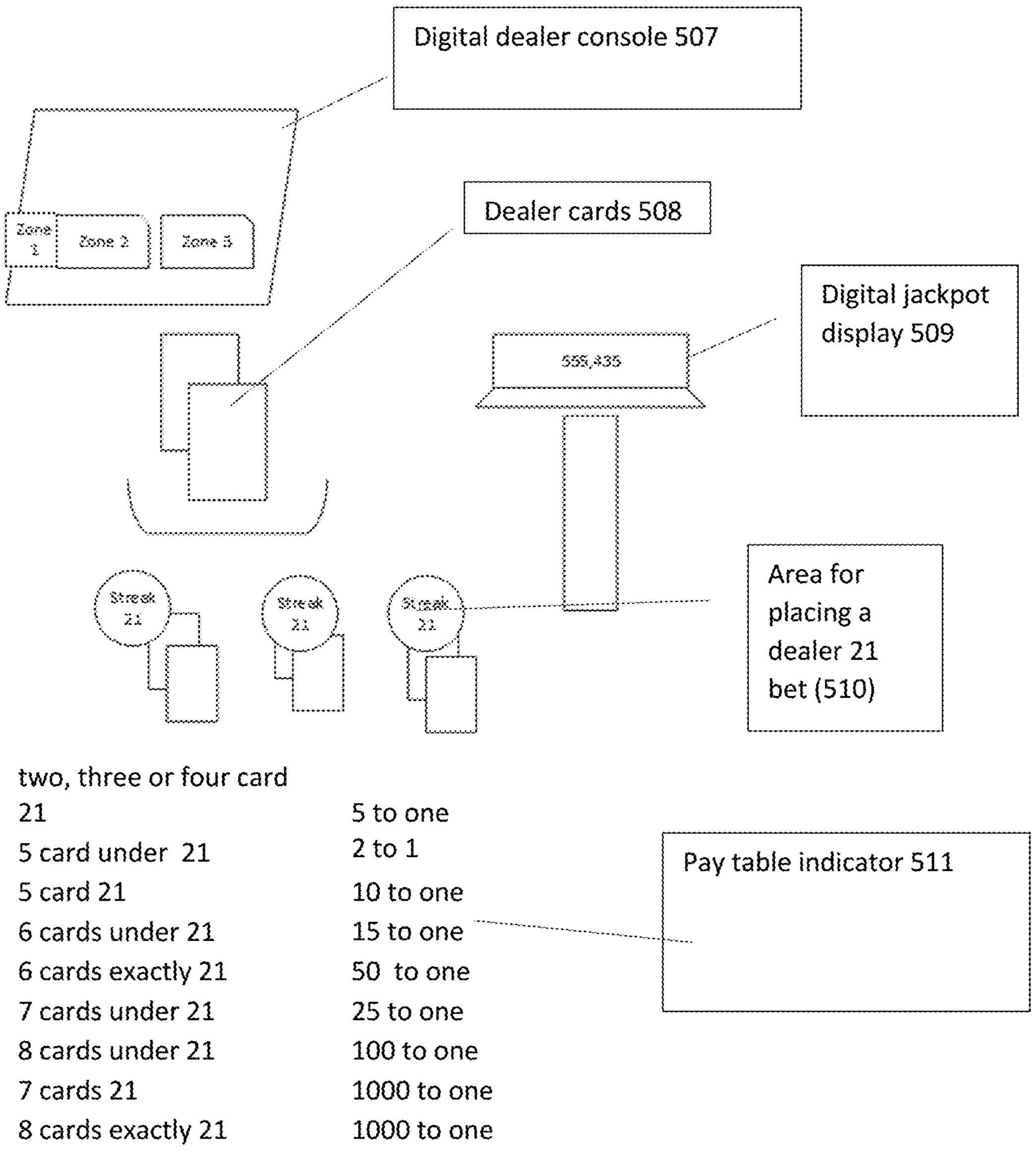
FIG. 5B is a blackjack table 21 game with a streak 21 side-bet.

FIG. 5B is a blackjack table apparatus what differentiates this from a normal apparatus is 1) there is an area for each player to place a "streak 21" side-bet", 2) There is a table indicator that instructs the dealer as how much to payout based on the bet of the player. With the payout as follows:

| | |
|---|---|
| two, three or four card 21 | 5 to one |
| 5 card under 21 | 2 to 1 |
| 5 card 21 | 10 to one |
| 6 cards under 21 | 15 to one |
| 6 cards exactly 21 | 50 to one |
| 7 cards under 21 | 25 to one |
| 8 cards under 21 | 100 to one |
| 7 cards 21 | 1000 to one |
| 8 cards exactly 21 | 1000 to one |

This particular bet is specifically for the dealer's cards, however other variations can be a payout for the players card or the players card in combination with the dealers or the players cards with the dealer card that excludes the dealers face down card. The top payout for this bonus could be progressive that is for each losing bet the payout goes up and the jackpot would be displayed on the digital jackpot display area. This system would have a sensor in the bet area to detect a chip and then the dealer would record the bets into the electronic database memory system through a processor and the jackpot amount on the digital display would increase incrementally via processor for each loosing bet and if a player won the progressive or mini-progressive that is part of the progressive would reset to an initial value amount.

In certain other embodiments, the game can only be for achieving 21 card values and exclude payouts for dealer values under 21.

Figure 6A:
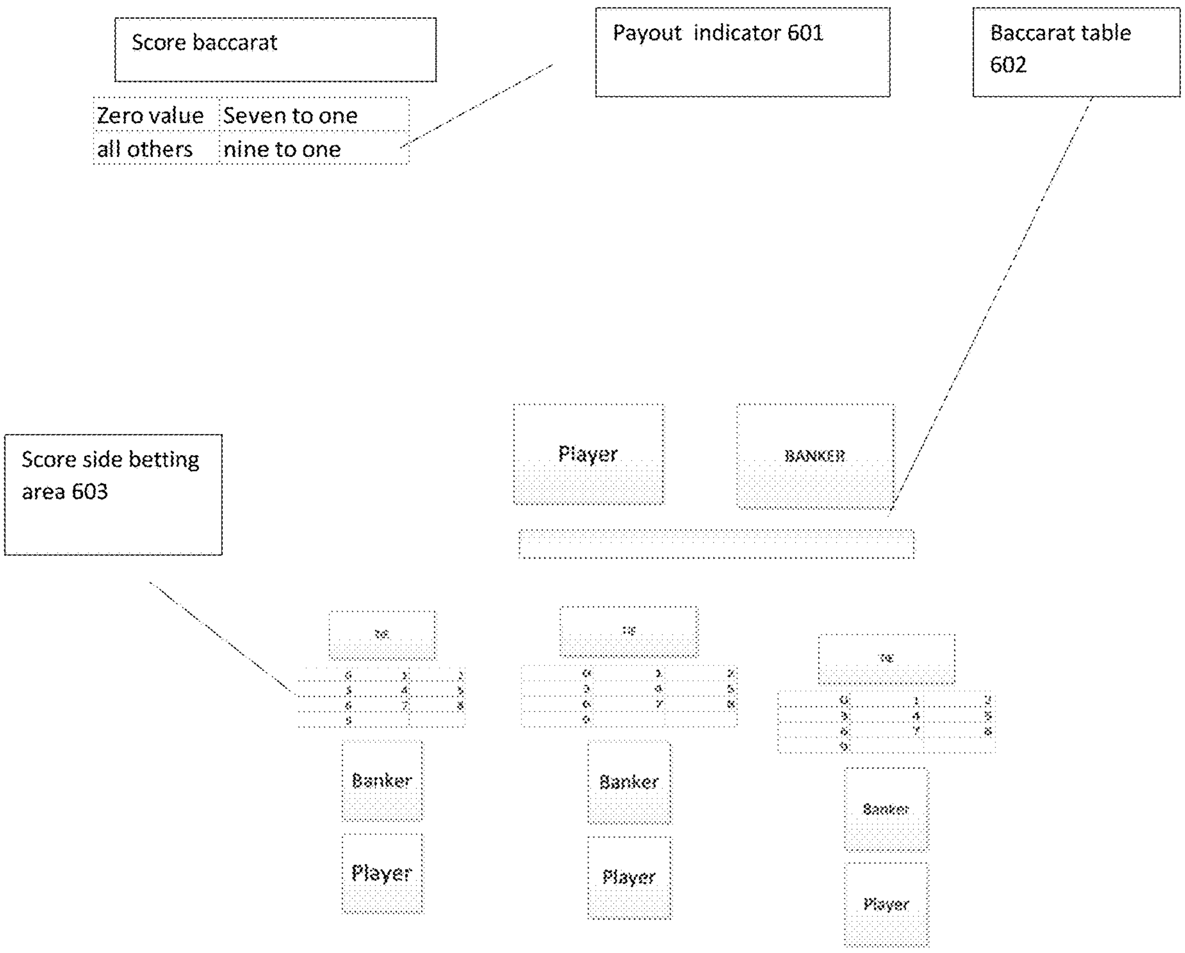
FIG. 6A is an embodiment of a baccarat side-bet where a player can bet on the exact outcome of baccarat cards 0 through 18.
Figure 6B:
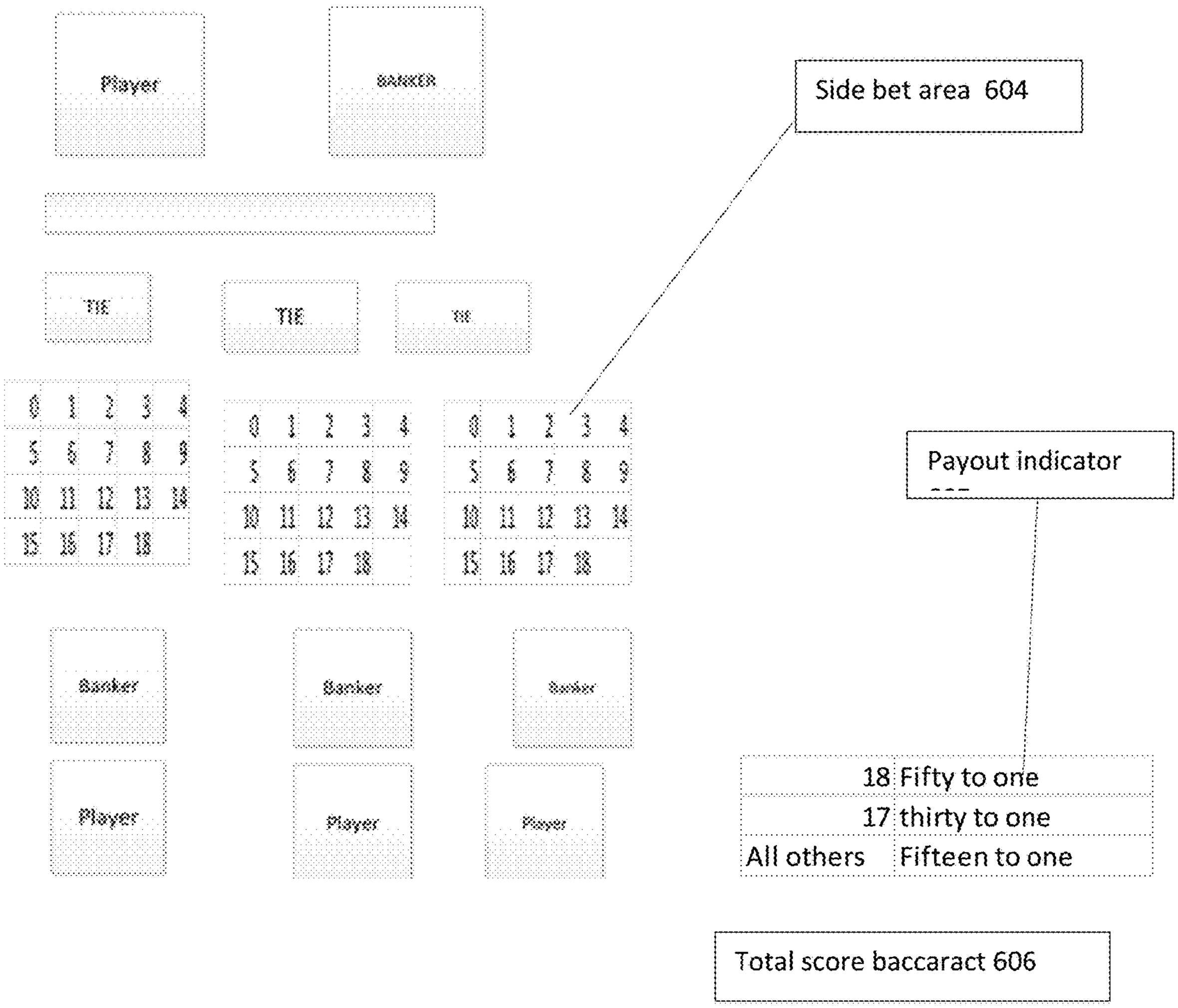
FIG. 6B is an embodiment of a baccarat side-bet where a player can bet on the exact outcome 0 through 9.

FIGS. 6A and 6B is a schematic of a baccarat table with two differences, each zone area has an area to play for the point outcome of the game in the "side-bet area" and there is a payout indicator for payout instructions for the dealer to follow. My patent application Jul. 15, 2014, entitled "METHODS, SYSTEMS, AND APPARATUS FOR PLAYING POKER, BLACKJACK AND BACCARAT" (U.S. Ser. No. 14/332,351), incorporated herein by reference, discussed a system wherein each outcome has a payout that generally corresponds the possibility of winning. In 6A a player places a wager that the total outcome of the dealer and player area will be zero to nine. A zero here has a lower payout since it occurs more frequently than the others. and all the other values pay nine to one. For example, if the value in the players area is 9 and the bankers area total value is five that would be a four value since in this game the first digit is dropped. The dealer would payout eight to one to all players that placed a bet on a four indicia within the side-bet area. Each zone has its own side-bet area In FIG. 6B there is a side-bet for a gambler to wage on the total value of the combined player and dealer hand. The first digit is dropped in the calculation of the dealer and banker value separately. In this bet the two final values are added and the left digit is not dropped for the final calculation, with the highest possible being 18. So, in the example given if a player placed a bet on a 14 value the gambler would be paid fifteen to one. Since an 18 and 17 value are least likely, the payout is the greatest for them for them over the others. There is much written in the Art and probability of baccarat outcomes. This paytable table is not a precise calculation but in general the payouts for the specific outcomes should be in general correspondence to the probability of winning that said outcome.

One of ordinary skill in the art will recognize that other exemplary embodiments of a gaming apparatus can be provided with a controller programmed to control one or more of the embodiments of the games described herein. The gaming apparatus is not limited to any particular apparatus and can include, for example, a personal or public apparatus, computer, notebook, or tablet, an apparatus accessible by another apparatus over a local network connection or global network connection, such as the Internet, an apparatus in a casino or the like, an apparatus requiring payment from a player, etc.

The various illustrations and, modules, described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a terminal. In the alternative, the processor and the storage medium may reside as discrete components in a terminal In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. An electronic gaming system for playing a casino game, the system comprising:

a processor; and a memory device that stores a plurality of instructions that, when executed by the processor, cause the processor to:

display, via a display device, at least five initial cards face up each card corresponding to a blackjack value, allow a player to select a plurality of the cards to hold, determine a replacement card for each of the non-held initial cards, and cause a display, by the display device, of the replacement card in that hand, wherein the player is a winner if at least five of the cards have a total value of twenty-one.

2. The gaming system of claim 1, wherein a payout is awarded to the player via the processor.

3. The gaming system of claim 1, wherein there are 6, 7 8 or 9 initial cards.

4. The gaming system of claim 2, wherein there are three or four sets of cards and the player is a winner if either set contains a plurality of card values that add up to twenty-one.

* * * * *